United States Patent
Li et al.

(10) Patent No.: US 11,064,477 B2
(45) Date of Patent: Jul. 13, 2021

(54) INFORMATION MONITORING METHOD, TERMINAL, AND NETWORK DEVICE

(71) Applicant: HUAWEI TECHNOLOGIES CO., LTD., Shenzhen (CN)

(72) Inventors: Junchao Li, Shanghai (CN); Hao Tang, Shanghai (CN); Fan Wang, Berkshire (GB); Zhenfei Tang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 16/668,074

(22) Filed: Oct. 30, 2019

(65) Prior Publication Data

US 2020/0084753 A1    Mar. 12, 2020

Related U.S. Application Data

(63) Continuation of application No. PCT/CN2018/085416, filed on May 3, 2018.

(30) Foreign Application Priority Data

May 5, 2017  (CN) .......................... 201710314141.4

(51) Int. Cl.
*H04W 4/00* (2018.01)
*H04W 72/04* (2009.01)

(52) U.S. Cl.
CPC ....... *H04W 72/042* (2013.01); *H04W 72/048* (2013.01); *H04W 72/0453* (2013.01)

(58) Field of Classification Search
CPC ........... H04W 72/042; H04W 72/0453; H04W 72/048; H04W 24/08; H04W 28/20; H04W 72/04; H04W 72/12; H04L 5/00
See application file for complete search history.

(56) References Cited

U.S. PATENT DOCUMENTS

| 8,873,362 | B2* | 10/2014 | Papasakellariou ........................... H04W 72/0466 370/203 |
| 8,873,501 | B2* | 10/2014 | Kawamura .......... H04B 1/7143 370/330 |

(Continued)

FOREIGN PATENT DOCUMENTS

| CN | 102932927 A | 2/2013 |
| CN | 105813202 A | 7/2016 |

OTHER PUBLICATIONS

Ericsson, "UE and basestation spectral confinement capabilities in NR", 3GPP TSG-RAN WG4 Meeting #82, R4-1700651, Feb. 13-17, 2017, total 6 pages, Athens, Greece.

(Continued)

*Primary Examiner* — Amancio Gonzalez
(74) *Attorney, Agent, or Firm* — Maier & Maier, PLLC

(57) ABSTRACT

An embodiment provides an information monitoring method, a terminal, and a network device. The method includes: allocating, by a network device, a first frequency domain resource to a terminal, where the first frequency domain resource is used as a bandwidth part of the terminal; obtaining, by the network device, a bandwidth capability of the terminal, and determining, based on the bandwidth capability and the first frequency domain resource, a second frequency domain resource allocated to the terminal, where the second frequency domain resource is used by the terminal to monitor common information; and sending, by the network device, indication information, where the indication information is used to indicate the second frequency domain resource. According to embodiments, common information and information about a terminal can be simultaneously monitored, thereby improving information monitoring efficiency.

16 Claims, 7 Drawing Sheets

(56) References Cited

U.S. PATENT DOCUMENTS

| | | | |
|---|---|---|---|
| 9,363,048 B2* | 6/2016 | Hart | H04L 5/001 |
| 9,826,540 B1* | 11/2017 | Li | H04W 72/1284 |
| 9,894,654 B2* | 2/2018 | Astely | H04L 5/0055 |
| 9,985,808 B2* | 5/2018 | Mukkavilli | H04L 69/22 |
| 10,097,250 B2* | 10/2018 | Choi | H04L 27/26 |
| 10,321,439 B2* | 6/2019 | Kim | H04W 72/0406 |
| 10,356,778 B2* | 7/2019 | Tseng | H04L 5/0053 |
| 10,382,280 B2* | 8/2019 | Iyengar | H04L 47/76 |
| 10,405,332 B2* | 9/2019 | Papasakellariou | H04L 5/0053 |
| 10,470,191 B2* | 11/2019 | Si | H04W 72/1252 |
| 10,616,769 B2* | 4/2020 | Damnjanovic | H04W 74/0816 |
| 10,743,299 B2* | 8/2020 | Yi | H04L 5/001 |
| 10,805,923 B2* | 10/2020 | Tang | H04W 72/10 |
| 2009/0303941 A1* | 12/2009 | Naka | H04W 72/0406 |
| | | | 370/329 |
| 2013/0089067 A1 | 4/2013 | Ji et al. | |
| 2013/0242882 A1* | 9/2013 | Blankenship | H04L 5/0041 |
| | | | 370/329 |
| 2016/0381666 A1* | 12/2016 | Kim | H04W 72/0446 |
| | | | 370/329 |
| 2018/0145818 A1* | 5/2018 | Choi | H04L 5/0051 |
| 2018/0199343 A1* | 7/2018 | Deogun | H04L 5/0094 |
| 2019/0007977 A1* | 1/2019 | Asterjadhi | H04W 74/006 |
| 2020/0029343 A1* | 1/2020 | Wang | H04W 72/12 |
| 2020/0092856 A1* | 3/2020 | Horiuchi | H04W 72/042 |
| 2020/0187170 A1* | 6/2020 | Shin | H04W 28/06 |
| 2020/0267702 A1* | 8/2020 | Kim | H04W 72/042 |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 14)", 3GPP TS 36.211 V14.2.0 (Mar. 2017), Mar. 2017, total 194 pages.

3GPP, "3rd Generation Partnership Project; Technical Specification Group Radio Access Network; Evolved Universal Terrestrial Radio Access (E-UTRA); Physical layer procedures (Release 14)", 3GPP TS 36.213 V14.2.0 (Mar. 2017), Mar. 2017, total 454 pages.

* cited by examiner

INFORMATION MONITORING METHOD, TERMINAL, AND NETWORK DEVICE

CROSS-REFERENCE TO RELATED APPLICATIONS

This application is a continuation of International Application No. PCT/CN2018/085416, filed on May 3, 2018, which claims priority to Chinese Patent Application No. 201710314141.4, filed on May 5, 2017. The disclosures of the aforementioned applications are hereby incorporated by reference in their entireties.

TECHNICAL FIELD

The embodiments relate to the communications field and to an information monitoring method, a terminal, and a network device.

BACKGROUND

In the 5th generation mobile communications (5G) new radio (NR) standard, a scenario in which a bandwidth capability of a terminal is less than a system bandwidth is contemplated. In the scenario, the manner in which the terminal monitors information has not been discussed.

SUMMARY

An embodiment provides an information monitoring method, a terminal, and a network device, so that the terminal can simultaneously monitor common information and information about the terminal, thereby improving information monitoring efficiency.

According to a first aspect, an information monitoring method is provided. The method includes: allocating, by a network device, a first frequency domain resource to a terminal, where the first frequency domain resource is used as a bandwidth part of the terminal; obtaining, by the network device, a bandwidth capability of the terminal, and determining, based on the bandwidth capability and the first frequency domain resource, a second frequency domain resource allocated to the terminal, where the second frequency domain resource is used by the terminal to monitor common information; and sending, by the network device, indication information, where the indication information is used to indicate the second frequency domain resource.

The bandwidth part is a segment of frequency domain resources, and includes frequency domain resources of at least one contiguous non-overlapping subcarrier or resource block (RB)/resource block group (RBG). The terminal transmits physical channel information and/or physical signal information on the bandwidth part. The network device allocates, to the terminal, the first frequency domain resource used as the bandwidth part of the terminal, obtains the bandwidth capability of the terminal, determines the second frequency domain resource based on the first frequency domain resource and the bandwidth capability of the terminal, and sends the indication information to the terminal to notify the terminal of the second frequency domain resource, so that the terminal monitors the common information on the second frequency domain resource. That is, the network device allocates a common bandwidth to the terminal by considering the bandwidth part of the terminal and the bandwidth capability of the terminal, so that the terminal can simultaneously monitor the common information and information about the terminal, thereby improving monitoring efficiency.

In some possible implementations, the determining, by the network device based on the bandwidth capability and the first frequency domain resource, a second frequency domain resource allocated to the terminal includes: determining, by the network device based on the bandwidth capability and the first frequency domain resource, a first common bandwidth in a plurality of common bandwidths as the second frequency domain resource, where a bandwidth size of the first frequency domain resource and the second frequency domain resource is less than or equal to the bandwidth capability of the terminal.

The network device may select the first common bandwidth from the plurality of common bandwidths, where a bandwidth size of the first common bandwidth and the bandwidth part of the terminal is less than or equal to the bandwidth capability of the terminal, and send the indication information to the terminal to notify the terminal of the first common bandwidth, so that the terminal can simultaneously monitor the common information and the information about the terminal, thereby improving information monitoring efficiency.

In some possible implementations, a difference between a start position of the second frequency domain resource and an end position of the first frequency domain resource is less than or equal to the bandwidth capability of the terminal.

The network device may select a common bandwidth from a plurality of common bandwidths as the first common bandwidth when the difference between a start position of the common bandwidth and the end position of the first frequency domain resource is less than or equal to the bandwidth capability of the terminal.

In some possible implementations, that a difference between a start position of the second frequency domain resource and an end position of the first frequency domain resource is less than or equal to the bandwidth capability of the terminal may be $0 \le I_{UBP}^{high} - I_{CBP}^{low} \le W_{max}$, where $I_{UBP}^{high}$ represents the end position of the first frequency domain resource, $I_{CBP}^{low}$ represents the start position of the second frequency domain resource, and $W_{max}$ represents the bandwidth capability of the terminal.

In some possible implementations, a difference between an end position of the second frequency domain resource and a start position of the first frequency domain resource is less than or equal to the bandwidth capability of the terminal.

The network device may select a common bandwidth from a plurality of common bandwidths as the first common bandwidth when the difference between an end position of the common bandwidth and the start position of the first frequency domain resource is less than or equal to the bandwidth capability of the terminal.

In some possible implementations, the difference between an end position of the second frequency domain resource and a start position of the first frequency domain resource is less than or equal to the bandwidth capability of the terminal such that $0 \le I_{CBP}^{high} - I_{UBP}^{low} \le W_{max}$, where $I_{UBP}^{low}$ represents the start position of the first frequency domain resource, $I_{CBP}^{high}$ represents the end position of the second frequency domain resource, and W represents the bandwidth capability of the terminal.

In some possible implementations, the determining, by the network device based on the bandwidth capability and the first frequency domain resource, a second frequency domain resource allocated to the terminal includes: determining, by the network device, a second position of the second frequency domain resource based on a bandwidth size of the first frequency domain resource, a bandwidth size of the second frequency domain resource, the bandwidth capability of the terminal, and a first position of the first frequency domain resource; and determining, by the network device, the second frequency domain resource based on the bandwidth size of the second frequency domain resource and the second position of the second frequency domain resource.

The network device may determine the second frequency domain resource based on the bandwidth size of the first frequency domain resource, the bandwidth size of the second frequency domain resource, the bandwidth capability of the terminal, and the first position of the first frequency domain resource, that is, allocate a common bandwidth to the terminal, so that the terminal can simultaneously monitor the common information and the information about the terminal.

In some possible implementations, the determining, by the network device, a second position of the second frequency domain resource based on a bandwidth size of the first frequency domain resource, a bandwidth size of the second frequency domain resource, the bandwidth capability of the terminal, and a first position of the first frequency domain resource includes: determining, by the network device, a threshold range of a start position of the second frequency domain resource based on the bandwidth size of the first frequency domain resource, the bandwidth size of the second frequency domain resource, the bandwidth capability of the terminal, and the first position of the first frequency domain resource; and determining, by the network device, any value within the threshold range of the start position of the second frequency domain resource as the start position of the second frequency domain resource.

To determine the second position of the second frequency domain resource, the network device may first determine a threshold range of the second position, and then select a value within the threshold range of the second position randomly. The first position may be a start position, an end position, or a center position of the first frequency domain resource, and the second position may be a start position, an end position, or a center position of the second frequency domain resource.

In some possible implementations, the determining, by the network device, a start position of the second frequency domain resource based on a bandwidth size of the bandwidth part of the terminal, a bandwidth size of a common bandwidth, the bandwidth capability of the terminal, and a start position of the first frequency domain resource may be determining a threshold range of the start position $I_{UBP}^{low}$ of the second frequency domain resource: $I_{UBP}^{low}-W_{max}+w_1 \leq I_{CBP}^{low} \leq I_{UBP}^{low}+W_{max}-w_2$, where $I_{UBP}^{low}$ represents the start position of the first frequency domain resource, $w_1$ represents the bandwidth size of the bandwidth part of the terminal, $w_2$ represents the bandwidth size of the common bandwidth, and $W_{max}$ represents the bandwidth capability of the terminal. The network device takes any $I_{CBP}^{low}$ from the threshold range of $I_{CBP}^{low}$ as the start position of the second frequency domain resource.

In some possible implementations, the determining, by the network device, a start position of the second frequency domain resource based on a bandwidth size of the bandwidth part of the terminal, a bandwidth size of a common bandwidth, the bandwidth capability of the terminal, and a start position of the first frequency domain resource may be determining a threshold range of a center position $I_{CBP}^{mid}$ of the second frequency domain resource such that:
$I_{UBP}^{low}-W_{max}+w_1+\lfloor w_2/2 \rfloor \leq I_{CBP}^{mid} \leq I_{UBP}^{low}+W_{max}-w_2+\lfloor w_2/2 \rfloor$, $w_2$ being an odd number; and $$I_{UBP}^{low} - W_{max} + w_1 + \frac{w_2}{2} \leq I_{CBP}^{mid} \leq I_{UBP}^{low} + W_{max} - w_2 + \frac{w_2}{2} - 1,$$

$w_2$ being an even number
where $I_{UBP}^{low}$ represents the start position of the first frequency domain resource, $w_1$ represents the bandwidth size of the bandwidth part of the terminal, $w_2$ represents the bandwidth size of the common bandwidth, and $W_{max}$ represents the bandwidth capability of the terminal. The network device takes any $I_{CBP}^{mid}$ from the threshold range of $I_{CBP}^{mid}$ as the center position of the second frequency domain resource.

In some possible implementations, the determining, by the network device, an end position of the second frequency domain resource based on a bandwidth size of the bandwidth part of the terminal, a bandwidth size of a common bandwidth, the bandwidth capability of the terminal, and a start position of the first frequency domain resource may be determining a threshold range of the end position $I_{CBP}^{high}$ of the second frequency domain resource: $I_{UBP}^{low}-W_{max}+w_1+w_2 \leq I_{CBP}^{high} \leq I_{UBP}^{low}+W_{max}$, where $w_1$ represents the bandwidth size of the bandwidth part of the terminal, $w_2$ represents the bandwidth size of the common bandwidth, and $W_{max}$ represents the bandwidth capability of the terminal. The network device takes any $I_{CBP}^{high}$ from the threshold range of $I_{CBP}^{high}$ as the end position of the second frequency domain resource.

In some possible implementations, the sending, by the network device, indication information includes: sending, by the network device, dynamic signaling, for example, by, sending, by the network device, physical layer signaling, where the physical layer signaling carries the indication information, and the physical layer signaling may be common downlink control information or terminal-specific downlink control information; or sending, by the network device, semi-static signaling, such as, sending, by the network device, higher layer signaling, where the higher layer signaling carries the indication information, and the higher layer signaling may be broadcast signaling, a system message, radio resource control (RRC) signaling, or media access control (MAC) layer signaling.

The network device may dynamically or semi-statically configure the indication information, thereby improving resource configuration flexibility.

According to a second aspect, an information monitoring method is provided. The method includes: sending, by a terminal, a bandwidth capability of the terminal to a network device; receiving, by the terminal, indication information, where the indication information is used to indicate a second frequency domain resource, the second frequency domain resource is determined by the network device based on the bandwidth capability of the terminal and a first frequency domain resource allocated to the terminal, and the first frequency domain resource is used as a bandwidth part of the terminal; and monitoring, by the terminal, common information on the second frequency domain resource.

The terminal sends the bandwidth capability to the network device, so that the network device can determine, based on the first frequency domain resource and the bandwidth capability of the terminal, the second frequency domain resource that is allocated to the terminal for monitoring the common information. The terminal monitors, on the second frequency domain resource, common information corresponding to a common bandwidth. That is, the network device allocates the common bandwidth to the terminal by considering the bandwidth part of the terminal and the bandwidth capability of the terminal, so that the terminal can monitor the common information corresponding to the common bandwidth and information about the terminal, thereby improving monitoring efficiency.

In some possible implementations, a difference between a start position of the second frequency domain resource and an end position of the first frequency domain resource is less than or equal to the bandwidth capability of the terminal.

In some possible implementations, a difference between an end position of the second frequency domain resource and a start position of the first frequency domain resource is less than or equal to the bandwidth capability of the terminal.

In some possible implementations, the receiving, by the terminal, indication information includes: receiving, by the terminal, physical layer signaling, where the physical layer signaling carries the indication information; or receiving, by the terminal, higher layer signaling, where the higher layer signaling carries the indication information. The terminal receives dynamic signaling, or, for example, receives the physical layer signaling, where the physical layer signaling carries the indication information, and the physical layer signaling may be common downlink control information or terminal-specific downlink control information. Alternatively, the terminal receives semi-static signaling, for example, the terminal receives the higher layer signaling, where the higher layer signaling carries the indication information, and the higher layer signaling may be broadcast signaling, a system message, RRC signaling, or MAC layer signaling.

According to a third aspect, an information monitoring method is provided. The method includes: receiving, by a terminal, indication information sent by a network device, where the indication information is used to indicate a plurality of common bandwidths; determining a first common bandwidth in the plurality of common bandwidths, where a bandwidth size of the first common bandwidth and a bandwidth part of the terminal is less than or equal to a bandwidth capability of the terminal; and monitoring, by the terminal, common information on the first common bandwidth.

The terminal may select the first common bandwidth from the plurality of common bandwidths, where a bandwidth size of the first common bandwidth and the bandwidth part of the terminal is less than or equal to the bandwidth capability of the terminal. Therefore, the terminal can simultaneously monitor the common information and information about the terminal, thereby improving monitoring efficiency.

In some possible implementations, the bandwidth part of the terminal and the first common bandwidth satisfy $0 \leq I_{CBP}^{high} - I_{UBP}^{low} \leq W_{max}$, where $I_{UBP}^{low}$ represents a start position of the bandwidth part of the terminal, $I_{CBP}^{high}$ represents an end position of the common bandwidth, and $W_{max}$ represents the bandwidth capability of the terminal.

The bandwidth size of the common bandwidth and the bandwidth part of the terminal is less than or equal to the bandwidth capability of the terminal. Thus, when a difference between an end position of the common bandwidth and the start position of the bandwidth part of the terminal is less than or equal to the bandwidth capability of the terminal, the terminal can simultaneously monitor the information about the terminal and the common information.

In some possible implementations, the bandwidth part of the terminal and the first common bandwidth satisfy $0 \leq I_{UBP}^{high} - I_{CBP}^{low} \leq W_{max}$, where $I_{UBP}^{high}$ represents an end position of the bandwidth part of the terminal, $I_{CBP}^{low}$ represents a start position of the first common bandwidth, and $W_{max}$ represents the bandwidth capability of the terminal.

The bandwidth size of the common bandwidth and the bandwidth part of the terminal is less than or equal to the bandwidth capability of the terminal. Thus, when a difference between the end position of the bandwidth part of the terminal and a start position of the common bandwidth is less than or equal to the bandwidth capability of the terminal, the terminal can simultaneously monitor the information about the terminal and the common information.

In some possible implementations, the receiving, by the terminal, indication information includes: receiving, by the terminal, dynamic signaling, for example, receiving, by the terminal, physical layer signaling, where the physical layer signaling carries the indication information, and the physical layer signaling may be common downlink control information or terminal-specific downlink control information.

In some possible implementations, the receiving, by the terminal, indication information includes: receiving, by the terminal, semi-static signaling, for example, receiving, by the terminal, higher layer signaling, where the higher layer signaling carries the indication information, and the higher layer signaling may be broadcast signaling, a system message, RRC signaling, or MAC layer signaling.

According to a fourth aspect, an information monitoring method is provided. The method includes: determining, by a network device, a plurality of common bandwidths; sending, by the network device, indication information to a terminal, where the indication information is used to indicate the plurality of common bandwidths, so that the terminal determines a first common bandwidth in the plurality of common bandwidths, and a bandwidth size of a first frequency domain resource of the first common bandwidth and a second frequency domain resource of a bandwidth part of the terminal is less than or equal to a bandwidth capability of the terminal; and monitoring common information on the first frequency domain resource.

The network device configures the plurality of common bandwidths and sends the indication information to notify the terminal of the plurality of common bandwidths. The terminal may determine a first common bandwidth in the plurality of common bandwidths, where a bandwidth size of the first common bandwidth and the bandwidth part of the terminal is less than or equal to the bandwidth capability of the terminal, so that the terminal can monitor the common information on the first common bandwidth. That is, the terminal can simultaneously monitor information about the terminal and the common information.

In some possible implementations, the sending, by the network device, indication information to a terminal includes: sending, by the network device, dynamic signaling to the terminal, for example, sending, by the network device, physical layer signaling to the terminal, where the physical layer signaling carries the indication information, and the physical layer signaling may be common downlink control information or terminal-specific downlink control information.

In some possible implementations, the sending, by the network device, indication information to a terminal includes: sending, by the network device, semi-static signaling to the terminal, for example, sending, by the network device, higher layer signaling to the terminal, where the higher layer signaling carries the indication information, and the higher layer signaling may be broadcast signaling, a system message, radio resource control signaling, or MAC layer signaling.

According to a fifth aspect, an information monitoring method is provided. The method includes: receiving, by a terminal, a first system parameter set and a second system parameter set from a network device, where the first system parameter set includes a subcarrier spacing size of a first bandwidth part and a quantity of orthogonal frequency division multiplexing (OFDM) symbols included in each slot corresponding to the first bandwidth part, and the second system parameter set includes a subcarrier spacing size of a second bandwidth part and a quantity of OFDM symbols included in each slot corresponding to the second bandwidth part; determining, by the terminal based on the first system parameter set, the second system parameter set, radio frequency switching duration of the terminal, and a switching start time of the terminal within the first bandwidth part, a switching time interval for switching from the first bandwidth part to the second bandwidth part; and switching, by the terminal based on the switching time interval, to the second bandwidth part to monitor information.

The terminal may determine, based on the first system parameter set, the radio frequency switching duration of the terminal, and the switching start time of the terminal within the first bandwidth part, the switching time interval for switching from the first bandwidth part to the second bandwidth part, and can obtain, by adding the switching time interval to a slot to which the switching start time of the terminal belongs, a slot that can be used to monitor data corresponding to the second bandwidth part, thereby ensuring data receiving accuracy.

In some possible implementations, the determining, by the terminal based on the first system parameter set, the second system parameter set, radio frequency switching duration of the terminal, and a switching start time of the terminal within the first bandwidth part, a switching time interval for switching from the first bandwidth part to the second bandwidth part includes: determining the switching time interval $$k = \left\lceil \left(T_{re} - (M_1 - m_1)\frac{15K}{14 \cdot SCS_1}\right)^+ \cdot \frac{14 \cdot SCS_2}{15K \cdot M_2}\right\rceil + 1$$

based on $SCS_1$, $SCS_2$, $M_1$, $M_2$, $T_{re}$, and $m_1$, where $SCS_1$ represents the subcarrier spacing size corresponding to the first bandwidth part, $SCS_2$ represents the subcarrier spacing size corresponding to the second bandwidth part, $M_1$ represents the quantity of symbols included in each slot corresponding to the first bandwidth part, $M_2$ represents the quantity of OFDM symbols included in each slot corresponding to the second bandwidth part, $T_{re}$ represents the radio frequency switching duration of the terminal, and $m_1$ represents the switching start time of the terminal within the first bandwidth part.

According to a sixth aspect, a network device is provided. The network device includes modules configured to perform the method according to the first aspect or any possible implementation of the first aspect.

According to a seventh aspect, a terminal is provided. The terminal includes modules configured to perform the method according to the second aspect or any possible implementation of the second aspect.

According to an eighth aspect, a system is provided. The system includes:
the network device according to the sixth aspect and the terminal according to the seventh aspect.

According to a ninth aspect, a network device is provided. The network device includes a processor, a memory, and a communications interface. The processor is connected to the memory and the communications interface. The memory is configured to store an instruction, the processor is configured to execute the instruction, and the communications interface is configured to communicate with other network elements under control of the processor. When the processor executes the instruction stored in the memory, the execution enables the processor to perform the method according to the first aspect or any possible implementation of the first aspect.

According to a tenth aspect, a terminal is provided. The terminal includes a processor, a memory, and a communications interface. The processor is connected to the memory and the communications interface. The memory is configured to store an instruction, the processor is configured to execute the instruction, and the communications interface is configured to communicate with other network elements under control of the processor. When the processor executes the instruction stored in the memory, the execution enables the processor to perform the method according to the second aspect or any possible implementation of the second aspect.

According to an eleventh aspect, a computer storage medium is provided. The computer storage medium stores program code, and the program code is used to indicate an instruction used to perform the method according to the first aspect or any possible implementation of the first aspect.

According to a twelfth aspect, a computer storage medium is provided. The computer storage medium stores program code, and the program code is used to indicate an instruction used to perform the method according to the second aspect or any possible implementation of the second aspect.

According to a thirteenth aspect, a terminal is provided. The terminal includes a module configured to perform the method according to the third aspect or any possible implementation of the third aspect.

According to a fourteenth aspect, a network device is provided. The network device includes a module configured to perform the method according to the fourth aspect or any possible implementation of the fourth aspect.

According to a fifteenth aspect, a system is provided. The system includes:
the network device according to the thirteenth aspect and the terminal according to the fourteenth aspect.

According to a sixteenth aspect, a terminal is provided. The terminal includes a processor, a memory, and a communications interface. The processor and the memory are connected to the communications interface. The memory is configured to store an instruction, the processor is configured to execute the instruction, and the communications interface is configured to communicate with other network elements under control of the processor. When the processor executes the instruction stored in the memory, the execution enables the processor to perform the method according to the third aspect or any possible implementation of the third aspect.

According to a seventeenth aspect, a network device is provided. The network device includes a processor, a memory, and a communications interface. The processor and the memory are connected to the communications interface. The memory is configured to store an instruction, the processor is configured to execute the instruction, and the communications interface is configured to communicate with other network elements under control of the processor. When the processor executes the instruction stored in the memory, the execution enables the processor to perform the method according to the fourth aspect or any possible implementation of the fourth aspect.

According to an eighteenth aspect, a computer storage medium is provided. The computer storage medium stores program code, and the program code is used to indicate an instruction used to perform the method according to the third aspect or any possible implementation of the third aspect.

According to a nineteenth aspect, a computer storage medium is provided. The computer storage medium stores program code, and the program code is used to indicate an instruction used to perform the method according to the fourth aspect or any possible implementation of the fourth aspect.

According to a twentieth aspect, a terminal is provided. The terminal includes a module configured to perform the method according to the fifth aspect or any possible implementation of the fifth aspect.

According to a twenty-first aspect, a terminal is provided. The terminal includes a processor, a memory, and a communications interface. The processor and the memory are connected to the communications interface. The memory is configured to store an instruction, the processor is configured to execute the instruction, and the communications interface is configured to communicate with other network elements under control of the processor. When the processor executes the instruction stored in the memory, the execution enables the processor to perform the method according to the fifth aspect or any possible implementation of the fifth aspect.

According to a twenty-second aspect, a computer storage medium is provided. The computer storage medium stores program code, and the program code is used to indicate an instruction used to perform the method according to the fifth aspect or any possible implementation of the fifth aspect.

Based on the foregoing technical solutions, the network device allocates, to the terminal, the first frequency domain resource used as the bandwidth part of the terminal, obtains the bandwidth capability of the terminal, determines the second frequency domain resource based on the first frequency domain resource and the bandwidth capability of the terminal, and sends the indication information to the terminal to notify the terminal of the second frequency domain resource, so that the terminal monitors, on the second frequency domain resource, the common information corresponding to the common bandwidth. That is, the network device allocates the common bandwidth to the terminal by considering the bandwidth part of the terminal and the bandwidth capability of the terminal, so that the terminal can simultaneously monitor the common information and the information about the terminal, thereby improving monitoring efficiency.

DESCRIPTION OF EMBODIMENTS

The following describes technical solutions with reference to the accompanying drawings.

The following terms are described so as to help a person skilled in the art have a better understanding.

(1) A terminal is also referred to as user equipment, a mobile station, a mobile terminal, or the like, and is a device that provides a user with voice and/or data connectivity, for example, a handheld device or an in-vehicle device with a wireless connection function. Some examples of a terminal are a mobile phone, a tablet, a notebook computer, a palmtop computer, a mobile Internet device, a wearable terminal, a virtual reality device, an augmented reality device, a wireless terminal for industrial control, a wireless terminal for self-driving, a wireless terminal for remote medical surgery, a wireless terminal in a smart grid, a wireless terminal for transportation safety, a wireless terminal in a smart city, a wireless terminal in a smart home, and the like.

(2) A radio access network (RAN) is a part, in a network, that connects a terminal to a wireless network. An RAN node (or device) is a node (or device) in the radio access network, and may also be referred to as a base station or a network device. Currently, some examples of the RAN node are a gNB, a transmission/reception point (TRP), an evolved NodeB (eNB), a radio network controller (RNC), a NodeB (NB), a base station controller (BSC), a base transceiver station (BTS), a home base station (for example, home evolved NodeB or home NodeB, HNB), a baseband unit (BBU), a Wi-Fi access point (AP), or the like. In addition, in a network structure, the RAN may include a centralized unit (CU) node and a distributed unit (DU) node. In this structure, protocol layers of an eNB in a long term evolution (LTE) system are split, where functions of some protocol layers are controlled by the CU in a centralized manner, functions of part or all of remaining protocol layers are distributed in the DU, and the CU controls DUs in a centralized manner.

(3) "A plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
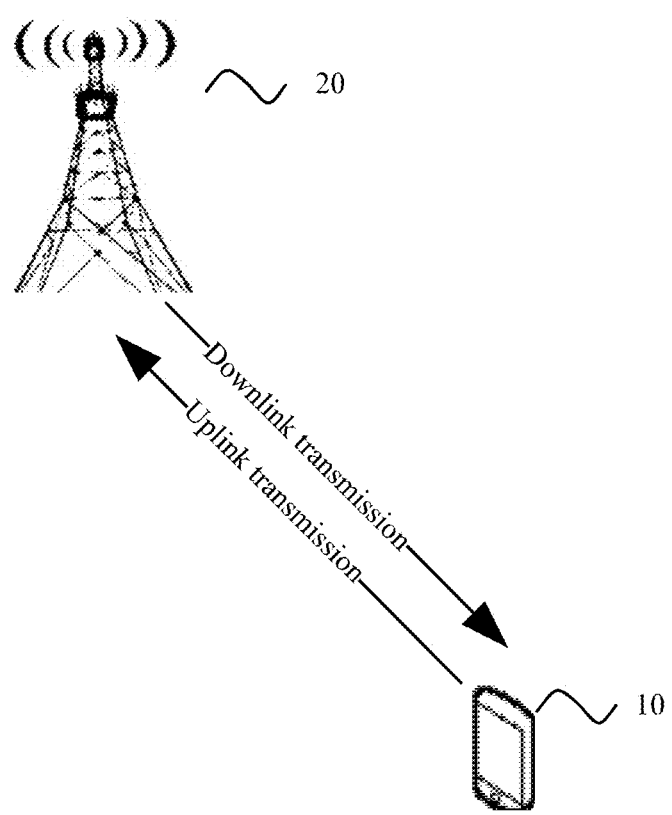
FIG. 1 is a schematic diagram of a scenario according to an embodiment.

FIG. 1 is a schematic diagram of a scenario. A communications system in FIG. 1 may include a terminal 10 and a network device 20. The network device 20 is configured to provide the terminal 10 with a communications service and enable the terminal 10 to access a core network. The terminal 10 accesses a network by searching a synchronization signal, a broadcast signal, or the like sent by the network device 20, so as to communicate with the network.

The arrows shown in FIG. 1 may represent uplink/downlink transmission performed by using cellular links between the terminal 10 and the network device 20.

In a 5G new radio standard, a scenario in which a bandwidth capability of a terminal is less than a system bandwidth is supported. In the scenario, how the terminal monitors information has not been discussed in the field.

Figure 2:
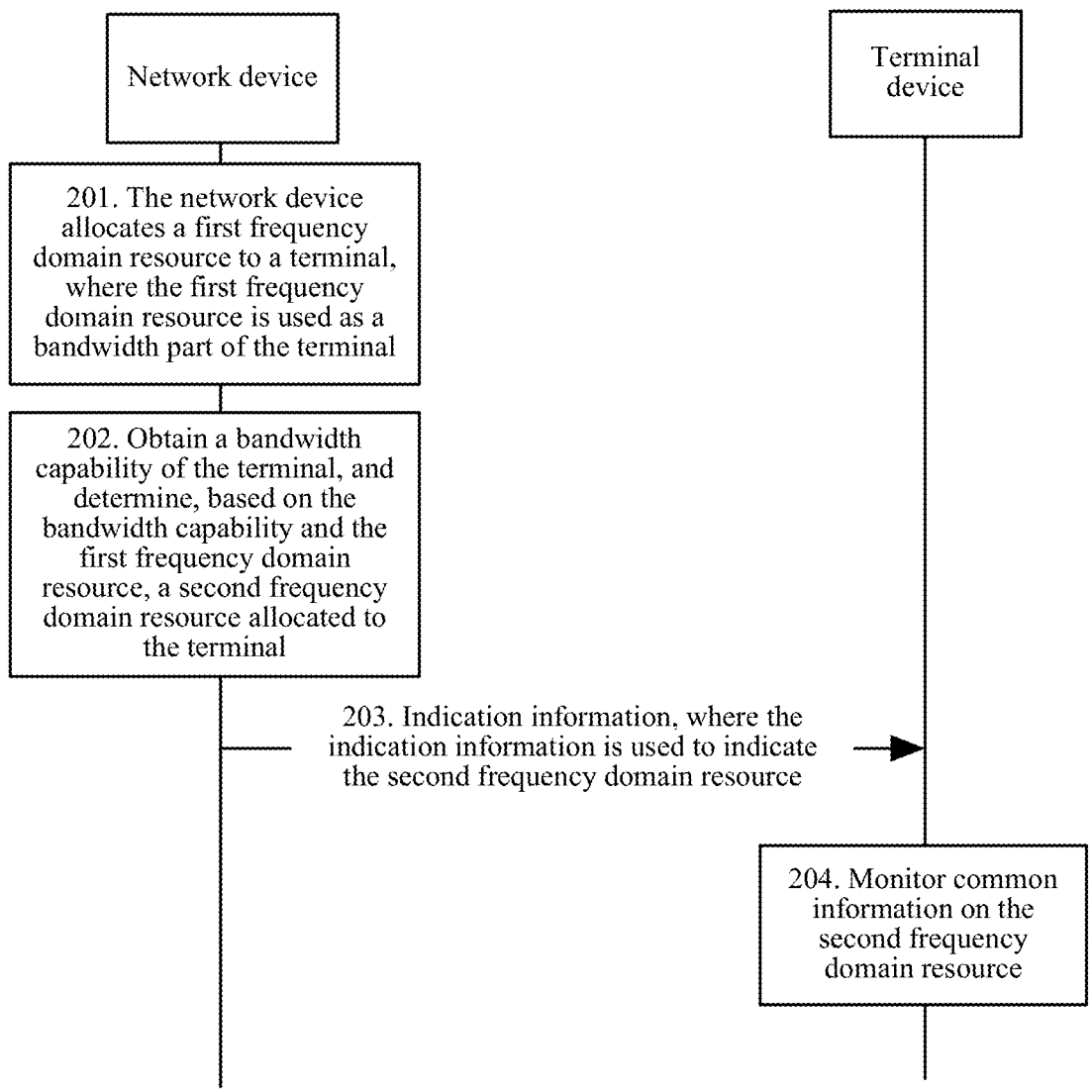
FIG. 2 is a schematic flowchart of an information monitoring method according to an embodiment.

FIG. 2 is a schematic flowchart of an information monitoring method according to an embodiment.

In step 201, a network device allocates a first frequency domain resource to a terminal, where the first frequency domain resource is used as a bandwidth part of the terminal.

For different terminals, the network device may allocate different frequency domain resources to the different terminals as bandwidth parts of the terminals. The bandwidth part may be a segment of frequency domain resources, and include frequency domain resources of at least one contiguous non-overlapping subcarrier or RBRBG. The terminal transmits physical channel information and/or physical signal information on the bandwidth part.

It should be understood that, the bandwidth part of the terminal may also be referred to as a "terminal-specific bandwidth part". This is not limited in this embodiment.

In step 202, the network device obtains a bandwidth capability of the terminal, and determines, based on the bandwidth capability and the first frequency domain resource, a second frequency domain resource allocated to the terminal, where the second frequency domain resource is used by the terminal to monitor common information.

Optionally, the determining, by the network device based on the bandwidth capability and the first frequency domain resource, a second frequency domain resource allocated to the terminal may be: determining, based on the bandwidth capability and the first frequency domain resource, a first common bandwidth in a plurality of common bandwidths as the second frequency domain resource.

The common bandwidth includes at least a common search space resource, and may further include a resource corresponding to a common message such as a system information block (SIB), or may include a synchronization signal block resource. If the common bandwidth is an initial access common bandwidth, the initial access common bandwidth may include a frequency domain resource of a synchronization signal block. The bandwidth part of the terminal includes at least a terminal-specific search space resource, and may further include a resource corresponding to terminal-specific uplink/downlink data.

It should be noted that the common bandwidth may be preset by the network device and the terminal, or may be configured through common signaling.

Optionally, the network device may determine a common bandwidth as the second frequency domain resource, where a bandwidth size of the common bandwidth and the first frequency domain resource is less than or equal to the bandwidth capability of the terminal.

That is, the network device may select the first common bandwidth from the plurality of common bandwidths, where a bandwidth size of the first common bandwidth and the bandwidth part of the terminal is less than or equal to the bandwidth capability of the terminal, and send the indication information to the terminal to notify the terminal of the first common bandwidth, so that the terminal can simultaneously monitor the first common bandwidth and the bandwidth part of the terminal, thereby improving information monitoring efficiency.

Optionally, the first common bandwidth may be an initial access common bandwidth, or may be another common bandwidth different from an initial access common bandwidth. This is not limited in this embodiment.

When a carrier includes a plurality of synchronization signal blocks, each synchronization signal block corresponds to one common bandwidth. If the terminal accesses a system through a first synchronization signal block in the plurality of synchronization signal blocks, a common bandwidth corresponding to the first synchronization signal block is an initial access common bandwidth. When the terminal accesses the system through the first synchronization signal block, the terminal may not know existence of another synchronization signal block and a corresponding common bandwidth.

When a bandwidth size of the bandwidth part of the terminal and the initial access common bandwidth is greater than the bandwidth capability of the terminal, the network device may indicate, by using the indication information, another common bandwidth satisfying that a bandwidth size of the other common bandwidth and the bandwidth part of the terminal is less than or equal to the bandwidth capability of the terminal. Therefore, the terminal can further simultaneously monitor information about the terminal and the common information.

It should be noted that the other common bandwidth is different from the initial access common bandwidth and may not include a synchronization signal block. This is not limited in this embodiment.

Optionally, where a bandwidth size of the first frequency domain resource and the second frequency domain resource is less than or equal to the bandwidth capability of the terminal may be found where the difference between a start position of the first frequency domain resource and an end position of the second frequency domain resource is less than or equal to the bandwidth capability of the terminal.

For example, the start position of the first frequency domain resource and the end position of the second frequency domain resource satisfy:

$$0 \le I_{CBP}^{high} - I_{UBP}^{low} \le W_{max} \tag{1}$$

where $I_{UBP}^{low}$ represents the start position of the first frequency domain resource, $I_{CBP}^{high}$ represents the end position of the second frequency domain resource, and $W_{max}$ represents the bandwidth capability of the terminal.

It should be noted that the bandwidth size of the common bandwidth and the bandwidth part of the terminal is less than or equal to the bandwidth capability of the terminal. Therefore, when the difference between the start position of the first frequency domain resource and the end position of the second frequency domain resource is less than or equal to the bandwidth capability of the terminal, the terminal can simultaneously monitor the information about the terminal and the common information.

It should be understood that, the difference between the start position of the first frequency domain resource and the end position of the second frequency domain resource may be a value obtained by the start position of the first frequency domain resource minus the end position of the second frequency domain resource, or may be a value obtained by the end position of the second frequency domain resource minus the start position of the first frequency domain resource. This is not limited in this embodiment.

Optionally, that a bandwidth size of the first frequency domain resource and the second frequency domain resource is less than or equal to the bandwidth capability of the terminal may alternatively be that a difference between an end position of the first frequency domain resource and a start position of the second frequency domain resource is less than or equal to the bandwidth capability of the terminal.

For example, the start position of the second frequency domain resource and the end position of the first frequency domain resource satisfy:

$$0 \leq I_{UBP}^{high} - I_{CBP}^{low} \leq W_{max}, \quad (2)$$

where $I_{UBP}^{high}$ represents the end position of the first frequency domain resource, $I_{CBP}^{low}$ represents the start position of the second frequency domain resource, and $W_{max}$ represents the bandwidth capability of the terminal.

It should be noted that the bandwidth size of the common bandwidth and the bandwidth part of the terminal is less than or equal to the bandwidth capability of the terminal. Therefore, when the difference between the end position of the first frequency domain resource and the start position of the second frequency domain resource is less than or equal to the bandwidth capability of the terminal, the terminal can simultaneously monitor the information about the terminal and the common information.

Optionally, if the first common bandwidth determined by the network device is used by a plurality of terminals to monitor the common information, the network device needs to determine, as the first common bandwidth, a common bandwidth satisfying each terminal. That is, the network device may determine, by using the foregoing formula (1) and formula (2), the common bandwidth satisfying each terminal, and then select a common bandwidth used by each terminal as the first common bandwidth. Alternatively, the network device may determine a smallest bandwidth capability in bandwidth capabilities of the plurality of terminals as $W_{max}$ in the foregoing formula (1).

It should be understood that different terminals may have different bandwidth capabilities.

Optionally, the network device may determine a second position of the second frequency domain resource based on a bandwidth size of the first frequency domain resource, a bandwidth size of the second frequency domain resource, the bandwidth capability of the terminal, and a first position of the first frequency domain resource, and then determine the second frequency domain resource based on the bandwidth size of the second frequency domain resource and the second position.

The first position may be a start position, a center position, or an end position of the first frequency domain resource, and the second position may be a start position, a center position, or an end position of the second frequency domain resource.

Optionally, the second position may correspond to the first position. For example, if the first position is the start position of the first frequency domain resource, the second position is the start position of the second frequency domain resource; if the first position is the center position of the first frequency domain resource, the second position is the center position of the second frequency domain resource; or if the first position is the end position of the first frequency domain resource, the second position is the end position of the second frequency domain resource. Alternatively, the second position does not correspond to the first position. For example, the first position is the start position of the first frequency domain resource, and the second position is the end position or the center position of the second frequency domain resource. This is not limited in this embodiment.

It should be understood that, the start position of the first frequency domain resource may be a minimum indexed RB or a minimum indexed RBG of the first frequency domain resource. Correspondingly, the end position is a maximum indexed RB or a maximum indexed RBG of the first frequency domain resource. Alternatively, the start position of the first frequency domain resource may be a maximum indexed RB or a maximum indexed RBG of the first frequency domain resource. Correspondingly, the end position is a minimum indexed RB or a minimum indexed RBG of the first frequency domain resource. For ease of description, in the following embodiments, the start position is a minimum indexed RB or a minimum indexed RBG.

It should be noted that a bandwidth size of the common bandwidth may be predefined by the network device and the terminal. Alternatively, after configuring a size of the common bandwidth, the network device sends indication information to the terminal to notify the terminal.

Optionally, the determining, by the network device, based on the first frequency domain resource and the bandwidth capability of the terminal, the second frequency domain resource of the common bandwidth may be: first determining the second position of the second frequency domain resource based on the bandwidth size of the bandwidth part of the terminal, the bandwidth size of the common bandwidth, the bandwidth capability of the terminal, and the first position of the first frequency domain resource, and then determining the second frequency domain resource based on the bandwidth size of the common bandwidth and the start position of the second frequency domain resource.

Optionally, the determining, by the network device, the start position of the second frequency domain resource based on the bandwidth size of the bandwidth part of the terminal, the bandwidth size of the common bandwidth, the bandwidth capability of the terminal, and the start position of the first frequency domain resource may be determining a threshold range of the start position $I_{CBP}^{low}$ of the second frequency domain resource such that:

$$I_{UBP}^{low} - W_{max} + w_1 \leq I_{CBP}^{low} \leq I_{UBP}^{low} + W_{max} - w_2 \quad (3)$$

where $I_{UBP}^{low}$ represents the start position of the first frequency domain resource, $w_1$ represents the bandwidth size of the bandwidth part of the terminal, $w_2$ represents the bandwidth size of the common bandwidth, and $W_{max}$ represents the bandwidth capability of the terminal.

The network device takes any $I_{CBP}^{low}$ from the threshold range of $I_{CBP}^{low}$ as the start position of the second frequency domain resource.

Optionally, the determining, by the network device, based on the first frequency domain resource and the bandwidth capability of the terminal, the second frequency domain resource of the common bandwidth may be: first determining the center position or the end position of the second frequency domain resource based on the bandwidth size of the bandwidth part of the terminal, the bandwidth size of the common bandwidth, the bandwidth capability of the terminal, and the start position of the first frequency domain resource, and then determining the second frequency domain resource based on the bandwidth size of the common bandwidth and the center position or the end position of the second frequency domain resource.

Optionally, the determining, by the network device, the center position of the second frequency domain resource based on the bandwidth size of the bandwidth part of the terminal, the bandwidth size of the common bandwidth, the bandwidth capability of the terminal, and the start position of the first frequency domain resource may be determining the threshold range of the center position $I_{CBP}^{mid}$ of the second frequency domain resource, such that:

$$I_{UBP}^{low} - W_{max} + w_1 + \lfloor w_2/2 \rfloor \leq I_{CBP}^{mid} \leq I_{UBP}^{low} + W_{max} - w_2 \lfloor w_2/2 \rfloor, w_2 \text{ being an odd number; and} \quad (4)$$

$$I_{UBP}^{low} - W_{max} + w_1 + \frac{w_2}{2} \leq I_{CBP}^{mid} \leq I_{UBP}^{low} + W_{max} - w_2 + \frac{w_2}{2} - 1,$$

$w_2$ being an even number (5)

where $I_{UBP}^{low}$ represents the start position of the first frequency domain resource, $w_1$ represents the bandwidth size of the bandwidth part of the terminal, $w_2$ represents the bandwidth size of the common bandwidth, and $W_{max}$ represents the bandwidth capability of the terminal.

The network device takes any $I_{CBP}^{mid}$ from the threshold range of $I_{CBP}^{mid}$ as the center position of the second frequency domain resource.

It should be noted that when $w_2$ is an even number, the first RB after the center position is used as a center RB.

If the first RB before the center position is used as a center RB, the threshold range of the center position $I_{CBP}^{mid}$ of the second frequency domain resource is:

$$I_{UBP}^{low} - W_{max} + w_1 + \lfloor w_2/2 \rfloor \leq I_{CBP}^{mid} \leq I_{UBP}^{low} + W_{max} - w_2 + \lfloor w_2/2 \rfloor \quad (6)$$

Optionally, the determining, by the network device, the end position of the second frequency domain resource based on the bandwidth size of the bandwidth part of the terminal, the bandwidth size of the common bandwidth, the bandwidth capability of the terminal, and the start position of the first frequency domain resource may be determining a threshold range of the end position $I_{CBP}^{high}$ of the second frequency domain resource, such that:

$$I_{UBP}^{low} - W_{max} + w_1 + w_2 \leq I_{CBP}^{high} \leq I_{UBP}^{low} + W_{max} \quad (7)$$

where $w_1$ represents the bandwidth size of the bandwidth part of the terminal, $w_2$ represents the bandwidth size of the common bandwidth, and $W_{max}$ represents the bandwidth capability of the terminal. The network device takes any $I_{CBP}^{high}$ from the threshold range of $I_{CBP}^{high}$ as the end position of the second frequency domain resource.

In step 203, the network device sends indication information to the terminal, where the indication information is used to indicate the second frequency domain resource.

Optionally, the network device sends the indication information to the terminal, where the indication information may be carried in terminal-specific signaling. The terminal-specific signaling may be dynamic signaling, for example, downlink control information of the terminal, or may be higher layer signaling, for example, RRC signaling or MAC layer signaling.

It may be contemplated that the network device alternatively sends, to the terminal, indication information indicating the first frequency domain resource.

Optionally, the indication information that indicates the first frequency domain resource and that is sent by the network device to the terminal may be carried in terminal-specific signaling. The terminal-specific signaling may be dynamic signaling, for example, terminal-specific downlink control information, or may be higher layer signaling, for example, RRC signaling or MAC layer signaling.

Optionally, the indication information that indicates the second frequency domain resource and that is sent by the network device to the terminal may alternatively be carried in common signaling. The common signaling may be dynamic signaling, for example, common downlink control information, or may be higher layer signaling, for example, a broadcast message or a system message.

In step 204, the terminal monitors the common information on the second frequency domain resource.

The terminal may monitor the common information on the second frequency domain resource. In addition, the terminal may further monitor the information about the terminal on the first frequency domain resource. The monitoring, by the terminal, the common information may be monitoring common downlink control signaling that is sent on a common search space resource and that is within the common bandwidth, may be monitoring a common message such as a system message and/or a synchronization signal, or the like. The monitoring, by the terminal, the information about the terminal may be monitoring terminal-specific downlink control signaling sent on a terminal-specific search space resource on the bandwidth part of the terminal, or may be monitoring terminal-specific uplink/downlink data.

Figure 3:
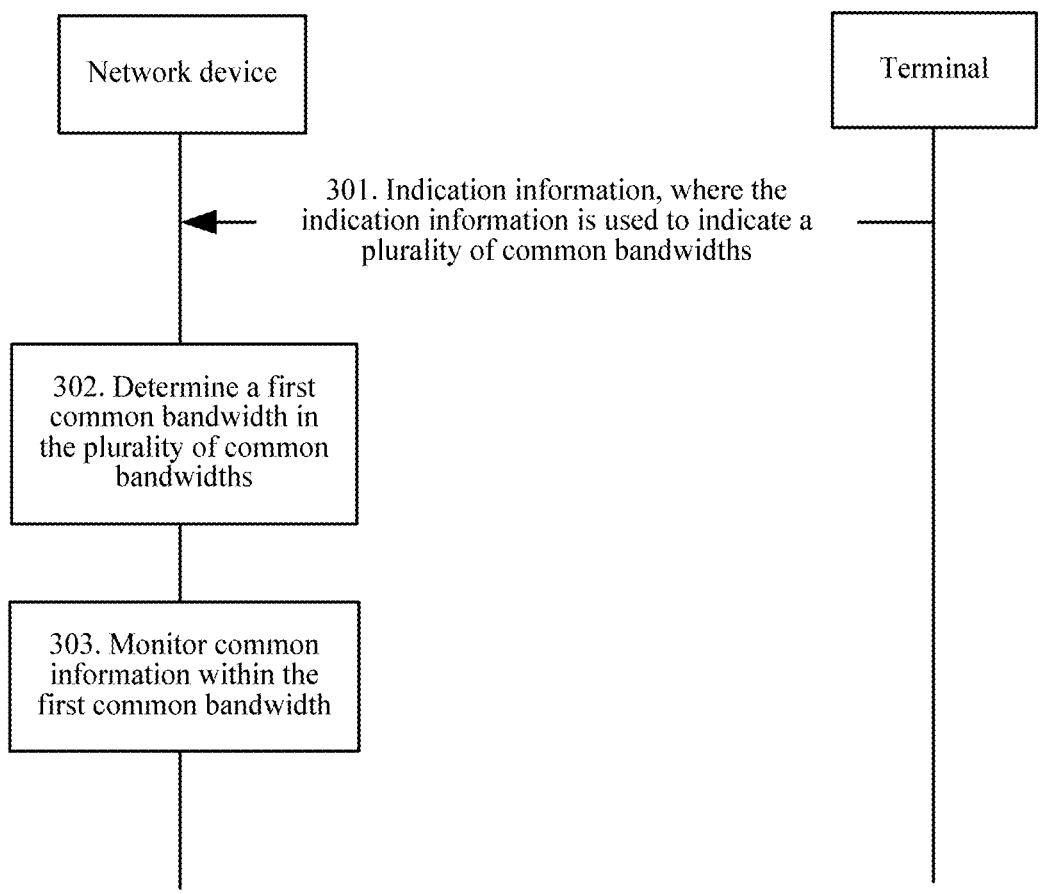
FIG. 3 is a schematic flowchart of an information monitoring method according to another embodiment.

Referring now to FIG. 3, FIG. 3 is a schematic flowchart of an information monitoring method according to another embodiment.

In step 301, a network device sends indication information to a terminal, where the indication information is used to indicate a plurality of common bandwidths.

It may be contemplated that the network device alternatively sends terminal-specific signaling to the terminal, where the terminal-specific signaling carries the indication information.

Optionally, the network device may send common signaling to the terminal, where the common signaling carries the indication information.

In step 302, the terminal determines a first common bandwidth in the plurality of common bandwidths, where a bandwidth size of the first common bandwidth and a bandwidth part of the terminal is less than or equal to a bandwidth capability of the terminal.

Optionally, the determining, by the terminal, a first common bandwidth in the plurality of common bandwidths may be determining a common bandwidth satisfying the following condition as the first common bandwidth:

$$0 \leq I_{CBP}^{high} - I_{UBP}^{low} \leq W_{max} \quad (8)$$

where $I_{UBP}^{low}$ represents a start position of the bandwidth part of the terminal, $I_{CBP}^{low}$ represents an end position of the first common bandwidth, and $W_{max}$ represents the bandwidth capability of the terminal.

It should be noted that the bandwidth size of the common bandwidth and the bandwidth part of the terminal is less than or equal to the bandwidth capability of the terminal. Therefore, when a difference between an end position of the common bandwidth and the start position of the bandwidth part of the terminal is less than or equal to the bandwidth capability of the terminal, the terminal can simultaneously monitor information about the terminal and common information.

Optionally, the determining, by the terminal, a first common bandwidth in the plurality of common bandwidths may be determining a common bandwidth satisfying the following condition as the first common bandwidth:

$$0 \leq I_{UBP}^{high} - I_{CBP}^{low} \leq W_{max} \quad (9)$$

where $I_{UBP}^{high}$ represents an end position of the bandwidth part of the terminal, $I_{CBP}^{low}$ represents a start position of the first common bandwidth, and $W_{max}$ represents the bandwidth capability of the terminal.

It should be noted that the bandwidth size of the common bandwidth and the bandwidth part of the terminal is less than or equal to the bandwidth capability of the terminal. Therefore, when a difference between the end position of the bandwidth part of the terminal and a start position of the common bandwidth is less than or equal to the bandwidth capability of the terminal, the terminal can simultaneously monitor information about the terminal and common information.

In step 303, the terminal monitors the common information within the first common bandwidth.

The terminal may monitor the common information within the first common bandwidth. In addition, the terminal may further monitor information on the bandwidth part of the terminal. That is, the terminal may select the first common bandwidth from the plurality of common bandwidths, where a bandwidth size of the first common bandwidth and the bandwidth part of the terminal is less than or equal to the bandwidth capability of the terminal. Thus, the terminal can simultaneously monitor the information about the terminal and the common information, thereby improving information monitoring efficiency.

For a given frequency band, the network device configures one or more common bandwidths. At least one of the common bandwidths includes at least a synchronization signal block, a common search space, and a common message such as a SIB and a random access response (RAR). The synchronization signal block includes a primary synchronization signal (PSS) and a secondary synchronization signal (SSS), and may further include a master information block (MIB). Remaining common bandwidths include at least a common search space, and/or a common message such as a SIB and RAR signaling.

For a given frequency band, the network device configures a bandwidth part for a terminal. The bandwidth part of the terminal includes at least a terminal-specific search space used to schedule uplink/downlink unicast data, and a physical downlink shared channel (PDSCH) corresponding to the downlink unicast data.

For a terminal that cannot simultaneously monitor information about the terminal and the common information, for example, if the bandwidth capability of the terminal is less than a total bandwidth of the common bandwidth and a bandwidth part of the terminal, the terminal can only monitor the common information and the information about the terminal in a time-division manner. That is, when needing to receive a synchronization signal block, a common search space, and/or a common message such as a SIB or an RAR, a radio frequency is adjusted to the common bandwidth, while within remaining slots, a radio frequency is adjusted to the bandwidth part of the terminal to receive a terminal-specific search space used to schedule uplink/downlink unicast data and/or a PDSCH corresponding to downlink unicast data. If a bandwidth of a first radio frequency corresponding to the common bandwidth is different from a bandwidth of a second radio frequency corresponding to the bandwidth part of the terminal, or the first radio frequency and the second radio frequency have different center frequencies, there is a switching delay when switching the terminal between the common bandwidth and the bandwidth part of the terminal. Because control channels of the common search space and the terminal-specific search space are both located on first several symbols of a slot, the switching between the common bandwidth and the bandwidth part of the terminal is inter-slot radio frequency bandwidth switching. When the terminal switches the bandwidth part, there is a need in the art to monitor information to ensure information receiving accuracy which urgently needs to be resolved.

Figure 4:
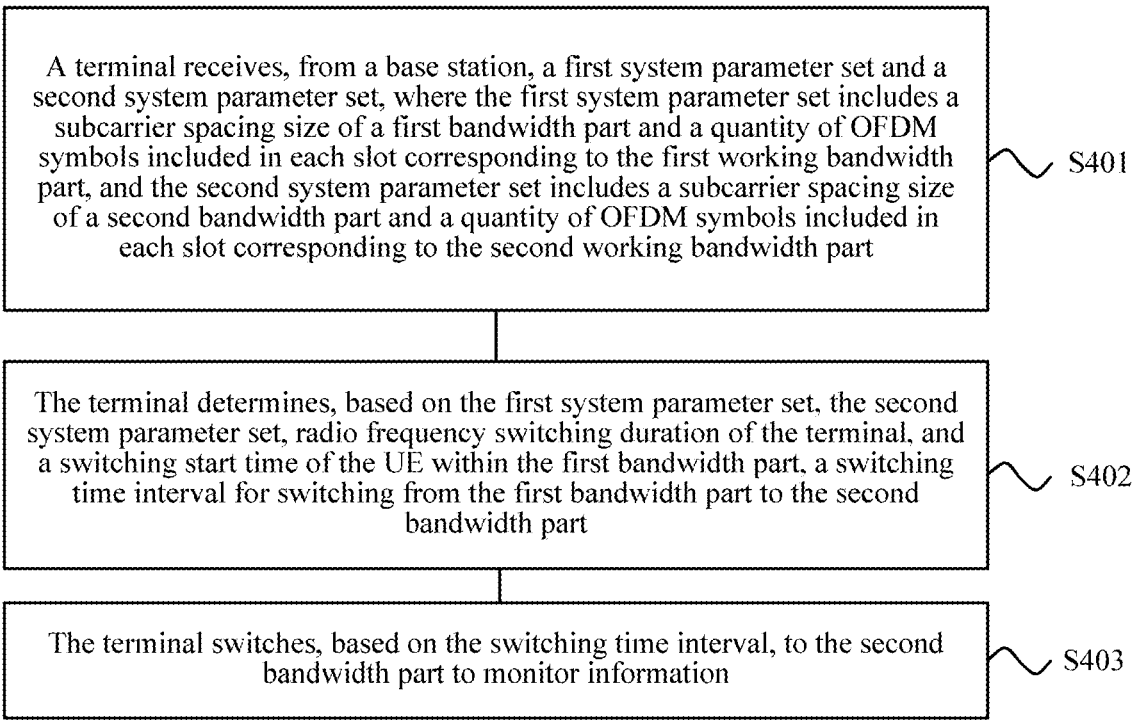
FIG. 4 is a schematic flowchart of an information monitoring method according to another embodiment.

FIG. 4 is a schematic flowchart of an information monitoring method according to another embodiment.

In step S401, a terminal receives, from a base station, a first system parameter set and a second system parameter set, where the first system parameter set includes a subcarrier spacing (SCS) size of a first bandwidth part and a quantity of orthogonal frequency division multiplexing (OFDM) symbols included in each slot corresponding to the first bandwidth part, and the second system parameter set includes a subcarrier spacing size of a second bandwidth part and a quantity of OFDM symbols included in each slot corresponding to the second bandwidth part.

Different subcarrier spacings are inversely proportional to lengths of the OFDM symbols. For example, a larger subcarrier spacing indicates a shorter length of an OFDM symbol. A duration of an OFDM symbol corresponding to a type of a subcarrier spacing 15 kHz is four times that of an OFDM symbol corresponding to a type of a subcarrier spacing 60 kHz. A slot may be a relative unit, and a quantity of OFDM symbols included in the slot is only defined.

Radio frequency switching duration of a terminal is a capability of the terminal, and it may be understood as that radio frequency switching duration of each terminal is a fixed value, and radio frequency switching duration of different terminals may be the same or different.

It should be understood that, the system parameter set may further include a cyclic prefix length, a transmission time unit length, a symbol length, and the like. This is not limited in this embodiment.

In step S402, the terminal determines, based on the first system parameter set, the second system parameter set, radio frequency switching duration of the terminal, and a switching start time of the terminal within the first bandwidth part, a switching time interval for switching from the first bandwidth part to the second bandwidth part.

Optionally, the determining, by the terminal based on the first system parameter set, the second system parameter set, radio frequency switching duration of the terminal, and a switching start time of the terminal within the first bandwidth part, a switching time interval for switching from the first bandwidth part to the second bandwidth part may be implemented through $$k = \left\lceil \left(T_{re} - (M_1 - m_1) \cdot \frac{15K}{14 \cdot SCS_1}\right)^+ \cdot \frac{14 \cdot SCS_2}{15K \cdot M_2} \right\rceil + 1,$$

where $SCS_1$ and $SCS_2$ respectively represent the subcarrier spacing size corresponding to the first bandwidth part and the subcarrier spacing size corresponding to the second bandwidth part, $M_1$ and $M_2$ respectively represent the quantity of OFDM symbols included in each slot corresponding to the first bandwidth part and the quantity of OFDM symbols included in each slot corresponding to the second bandwidth part, $T_{re}$ represents the radio frequency switching duration of the terminal, and $m_1$ represents the switching start time of the terminal within the first bandwidth part.

Figure 5:
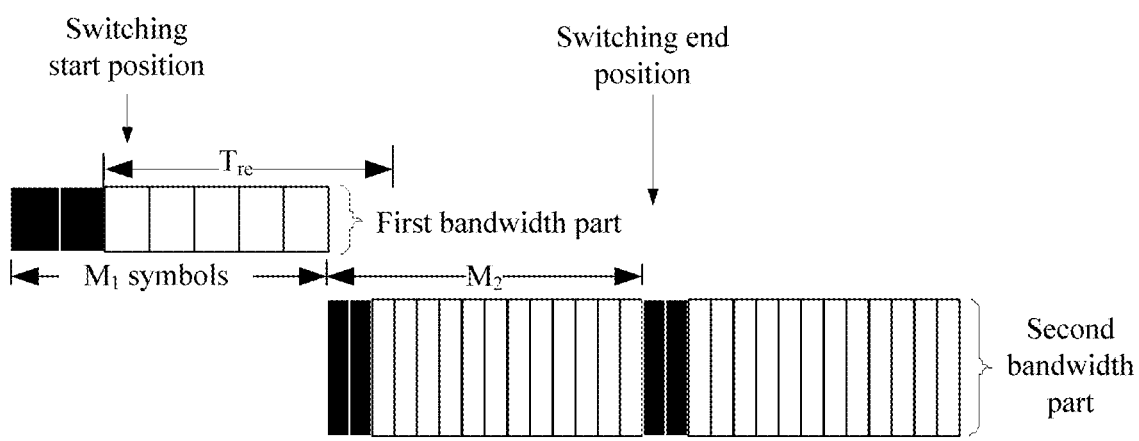
FIG. 5 is a schematic flowchart of an information monitoring method according to another embodiment.

FIG. 5 is a schematic flowchart of an information monitoring method. As shown in FIG. 5, that a slot corresponding to the first bandwidth part includes seven OFDM symbols and a slot corresponding to the second bandwidth part includes 14 OFDM symbols is used as an example for description. Therefore, an absolute duration of the slot corresponding to the first bandwidth part is $$\frac{7.5K}{SCS_1},$$

an absolute duration of each corresponding symbol is $$\frac{7.5K}{7 \cdot SCS_1} = \frac{15K}{14 \cdot SCS_1},$$

and an absolute duration of the slot corresponding to the second bandwidth part is $$\frac{15K \cdot M_2}{14 \cdot SCS_2}.$$

The terminal starts to perform switching from the $m_1^{th}$ symbol within a current slot of the first bandwidth part. In this case, within the radio frequency switching duration of the terminal, an absolute duration of other slots than the current slot of the first bandwidth part is $$\left(T_{re} - (M_1 - m_1) \cdot \frac{15K}{14 \cdot SCS_1}\right)^+.$$

A function $(x)^+ = \max(0, x)$ is used. Thus, the quantity of slots that are within the second bandwidth part and that correspond to the absolute duration of the other slots is $$\left[\left(T_{re} - (M_1 - m_1) \cdot \frac{15K}{14 \cdot SCS_1}\right)^+ \cdot \frac{14 \cdot SCS_2}{15K \cdot M_2}\right].$$

Therefore, the terminal needs to monitor information corresponding to the second bandwidth part starting from the $$\left(\left[\left(T_{re} - (M_1 - m_1) \cdot \frac{15K}{14 \cdot SCS_1}\right)^+ \cdot \frac{14 \cdot SCS_2}{15K \cdot M_2}\right] + 1\right)^{th}$$

slot after the current slot.

It may be contemplated that, the subcarrier spacing of the second bandwidth part may be different from or the same as the subcarrier spacing of the first bandwidth part. This is not limited in this embodiment. For example, the first bandwidth part may be a common bandwidth, and the second bandwidth part may be a bandwidth part of the terminal.

In step S403, the terminal switches, based on the switching time interval, to the second bandwidth part to monitor information.

The terminal can obtain, by adding the switching time interval to a slot to which the switching start time of the terminal belongs, a slot that can be used to monitor the second bandwidth part, thereby ensuring information receiving accuracy.

For example, the switching start time of the terminal is an $n^{th}$ slot. In this case, the second bandwidth part is monitored within an $(n+k)^{th}$ slot.

It should be understood that sequence numbers of the foregoing processes do not mean execution sequences in various embodiments. The execution sequences of the processes should be determined based on functions and internal logic of the processes, and should not be construed as any limitation on the implementation processes of the embodiments.

The foregoing describes the information monitoring method according to the embodiments in detail. The following describes, with reference to FIG. 6 and FIG. 7, a terminal and a network device according to the embodiments.

Figure 6:
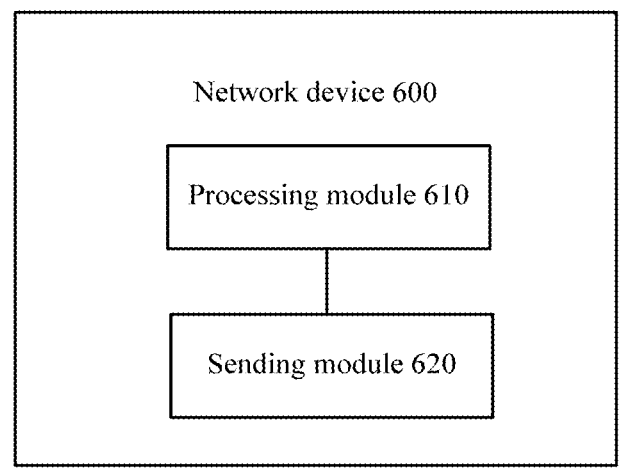
FIG. 6 is a schematic block diagram of a network device according to an embodiment.

FIG. 6 is a schematic block diagram of a network device 600 according to an embodiment. As shown in FIG. 6, the network device 600 includes:

a processing module 610, configured to allocate a first frequency domain resource to a terminal, where the first frequency domain resource is used as a bandwidth part of the terminal, where the processing module 610 is further configured to obtain a bandwidth capability of the terminal, and determine, based on the bandwidth capability and the first frequency domain resource, a second frequency domain resource allocated to the terminal, where the second frequency domain resource is used by the terminal to monitor common information; and a sending module 620, configured to send indication information, where the indication information is used to indicate the second frequency domain resource.

Optionally, the processing module 610 is configured to: determine, based on the bandwidth capability and the first frequency domain resource, a first common bandwidth in a plurality of common bandwidths as the second frequency domain resource, where a bandwidth size of the first frequency domain resource and the second frequency domain resource is less than or equal to the bandwidth capability of the terminal.

Optionally, the difference between a start position of the second frequency domain resource and an end position of the first frequency domain resource is less than or equal to the bandwidth capability of the terminal.

Optionally, the difference between an end position of the second frequency domain resource and a start position of the first frequency domain resource is less than or equal to the bandwidth capability of the terminal.

Optionally, the processing module 610 is configured to: determine a second position of the second frequency domain resource based on a bandwidth size of the first frequency domain resource, a bandwidth size of the second frequency domain resource, the bandwidth capability of the terminal, and a first position of the first frequency domain resource; and determine the second frequency domain resource based on the bandwidth size of the second frequency domain resource and the second position of the second frequency domain resource.

Optionally, the processing module 610 is configured to: determine a threshold range of a start position of the second frequency domain resource based on the bandwidth size of the first frequency domain resource, the bandwidth size of the second frequency domain resource, the bandwidth capability of the terminal, and the first position of the first frequency domain resource; and determine any value within the threshold range of the start position of the second frequency domain resource as the start position of the second frequency domain resource.

Optionally, the sending module 620 is configured to: send physical layer signaling, where the physical layer signaling carries the indication information; or send higher layer signaling, where the higher layer signaling carries the indication information.

Therefore, the network device according to this embodiment allocates, to the terminal, the first frequency domain resource used as the bandwidth part of the terminal, obtains the bandwidth capability of the terminal, determines the second frequency domain resource based on the first frequency domain resource and the bandwidth capability of the terminal, and sends the indication information to the terminal to notify the terminal of the second frequency domain resource, so that the terminal monitors, on the second frequency domain resource, the common information corresponding to the common bandwidth. That is, the network device allocates the common bandwidth to the terminal by considering the bandwidth part of the terminal and the bandwidth capability of the terminal, so that the terminal can simultaneously monitor information about the terminal and the common information, thereby improving monitoring efficiency.

It should be understood that, the network device 600 according to this embodiment may correspond to the network device in the information monitoring method in the embodiments, and the foregoing and other management operations and/or functions of various modules of the network device 600 are respectively intended to implement corresponding steps of the foregoing methods. For brevity, details are not described herein again.

Figure 7:
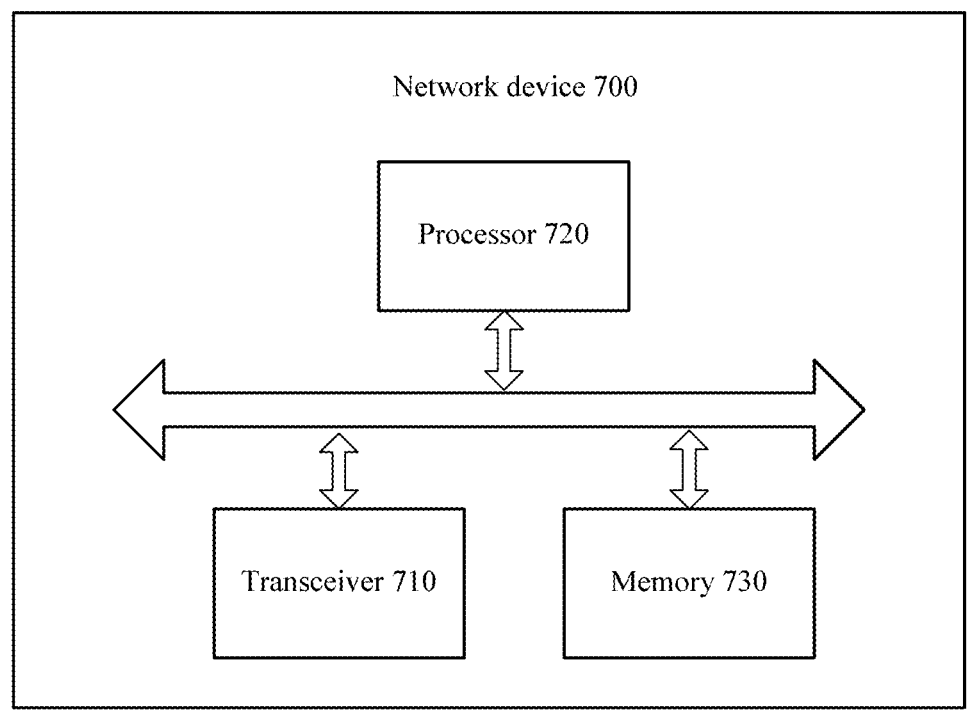
FIG. 7 is a schematic structural diagram of a network device according to an embodiment.

The sending module 620 in this embodiment may be implemented by a transceiver, and the processing module 610 may be implemented by a processor. As shown in FIG. 7, a network device 700 may include a transceiver 710, a processor 720, and a memory 730. The memory 730 may be configured to store indication information, and may further be configured to store code, instructions, and the like to be executed by the processor 720.

Figure 8:
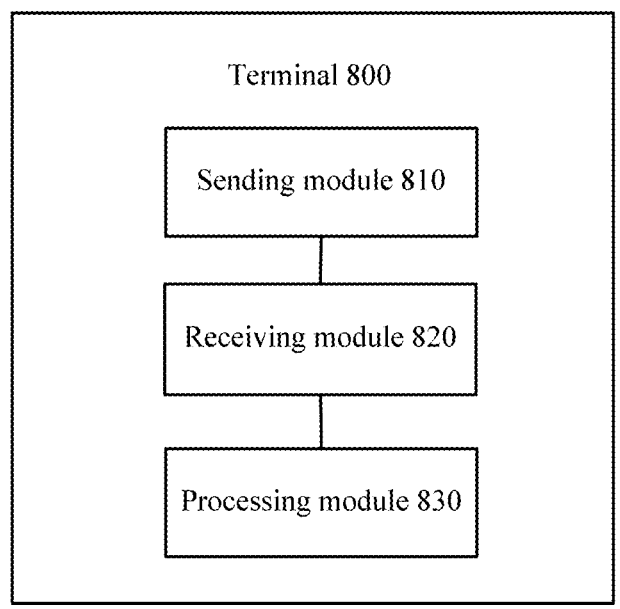
FIG. 8 is a schematic block diagram of a terminal according to an embodiment.

FIG. 8 is a schematic block diagram of a terminal 800 according to an embodiment. As shown in FIG. 8, the terminal 800 includes:

a sending module 810, configured to send a bandwidth capability of the terminal to a network device;

a receiving module 820, configured to receive indication information, where the indication information is used to indicate a second frequency domain resource, the second frequency domain resource is determined by the network device based on the bandwidth capability of the terminal and a first frequency domain resource allocated to the terminal, and the first frequency domain resource is used as a bandwidth part of the terminal; and a processing module 830, configured to monitor common information on the second frequency domain resource.

Optionally, the difference between a start position of the second frequency domain resource and an end position of the first frequency domain resource is less than or equal to the bandwidth capability of the terminal.

Optionally, the difference between an end position of the second frequency domain resource and a start position of the first frequency domain resource is less than or equal to the bandwidth capability of the terminal.

Optionally, the receiving module 820 is configured to: receive physical layer signaling, where the physical layer signaling carries the indication information; or receive higher layer signaling, where the higher layer signaling carries the indication information.

Therefore, the terminal according to this embodiment sends the bandwidth capability of the terminal to the network device, and receives the indication information that indicates the second frequency domain resource and that is sent by the network device, where the second frequency domain resource is determined by the network device based on the first frequency domain resource and the bandwidth capability of the terminal. The terminal monitors, on the second frequency domain resource, the common information corresponding to the common bandwidth. That is, the network device allocates the common bandwidth to the terminal by considering the bandwidth part of the terminal and the bandwidth capability of the terminal, so that the terminal can simultaneously monitor the information about the terminal and the common information, thereby improving monitoring efficiency.

It may be contemplated that, the terminal 800 according to this embodiment may correspond to the terminal in the information monitoring method in the embodiments, and the foregoing and other management operations and/or functions of various modules of the terminal 800 are respectively intended to implement corresponding steps of the foregoing methods. For brevity, details are not described herein again.

Figure 9:
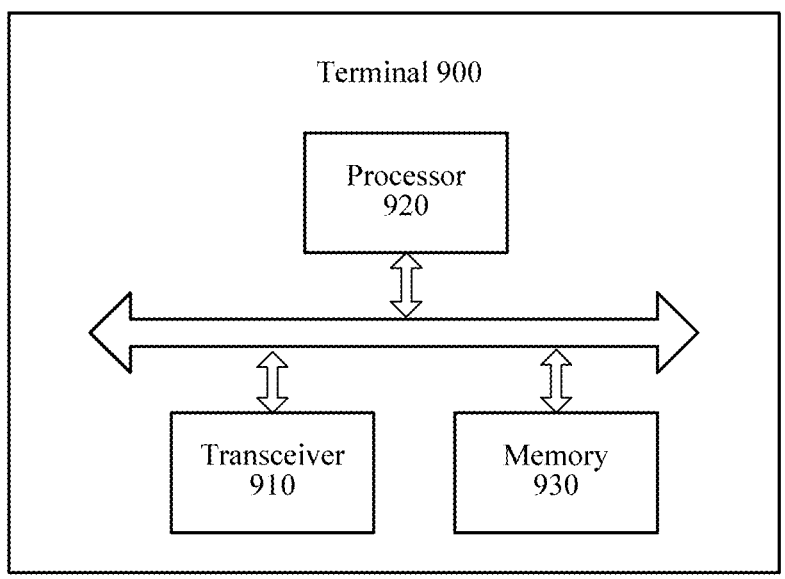
FIG. 9 is a schematic structural diagram of a terminal according to an embodiment.

The sending module 810 and the receiving module 820 in this embodiment may be implemented by a transceiver, and the processing module 830 may be implemented by a processor. As shown in FIG. 9, a terminal 900 may include a transceiver 910, a processor 920, and a memory 930. The memory 930 may be configured to store indication information, and may further be configured to store code, instructions, and the like to be executed by the processor 920.

It should be understood that, the processor 720 or the processor 920 may be an integrated circuit chip, and have a signal processing capability. In an implementation process, the steps in the foregoing embodiments may be implemented by using a hardware integrated logic circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or a transistor logic device, or a discrete hardware component. All the methods, steps, and logical block diagrams disclosed in the embodiments of the present invention can be implemented or performed by the processor. The general purpose processor may be a microprocessor or the processor may be any conventional processor, or the like. The steps of the methods disclosed in the embodiments of the present invention may be directly performed and completed by a hardware decoding processor, or may be performed and completed by using a combination of hardware and software modules in the decoding processor. The software module may be located in a mature storage medium in the art, such as a random access memory (RAM), a flash memory, a read-only memory, a programmable read-only memory or electrically erasable programmable memory, or a register. The storage medium is located in the memory, and the processor reads information in the memory and completes the steps in the foregoing methods in combination with hardware of the processor.

It may be understood that the memory 730 or the memory 930 in the embodiments of the present invention may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a RAM, used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory in the system and method described herein intends to include but is not limited to these memories and any other appropriate types of memories.

Figure 10:
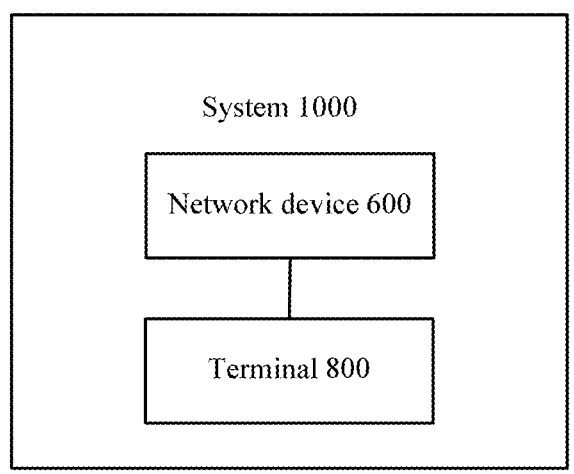
FIG. 10 is a schematic block diagram of a system according to an embodiment.

An embodiment further provides a system 1000. As shown in FIG. 10, the system 1000 includes:

the network device 700 according to the foregoing embodiment and the terminal 900 according to the foregoing embodiment.

An embodiment further provides a computer storage medium, and the computer storage medium may store a program instruction for performing any of the foregoing methods.

Optionally, the storage medium may be the memory 730 or 930.

A person of ordinary skill in the art may be aware that, the units and algorithm steps in the examples described with reference to the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk, a ROM, RAM, magnetic disk, or an optical disc.

The foregoing descriptions are merely implementations, but are not intended to limit the protection scope of the embodiments. Any variation or replacement readily figured out by a person skilled in the art within the technical scope disclosed herein shall fall within the protection scope. Therefore, the protection scope shall be subject to the protection scope of the claims.

What is claimed is:

1. An information monitoring method, comprising:
    allocating, by a network device, a first frequency domain resource to a terminal, wherein the first frequency domain resource is used as a bandwidth part of the terminal;
    obtaining, by the network device, a bandwidth capability of the terminal;
    determining, by the network device based on the bandwidth capability and the first frequency domain resource, a second frequency domain resource allocated to the terminal, wherein the second frequency domain resource is used by the terminal to monitor common information; and
    sending, by the network device, indication information, wherein the indication information is used to indicate the second frequency domain resource,
    wherein determining the second frequency domain resource further comprises:
    determining, by the network device, a second position of the second frequency domain resource based on a bandwidth size of the first frequency domain resource, a bandwidth size of the second frequency domain resource, the bandwidth capability of the terminal, and a first position of the first frequency domain resource; and
    determining, by the network device, the second frequency domain resource based on the bandwidth size of the second frequency domain resource and the second position of the second frequency domain resource,
    wherein determining the second position of the second frequency domain resource further comprises:
    determining, by the network device, a threshold range of a start position of the second frequency domain resource based on the bandwidth size of the first frequency domain resource, the bandwidth size of the second frequency domain resource, the bandwidth capability of the terminal, and the first position of the first frequency domain resource; and
    determining, by the network device, a value within the threshold range of the start position of the second frequency domain resource as the start position of the second frequency domain resource.

2. The method according to claim 1, wherein determining the second frequency domain resource further comprises:
    determining, by the network device based on the bandwidth capability and the first frequency domain resource, a first common bandwidth in a plurality of common bandwidths as the second frequency domain resource, wherein a bandwidth size of the first frequency domain resource and the second frequency domain resource is less than or equal to the bandwidth capability of the terminal.

3. The method according to claim 2, wherein a difference between a start position of the second frequency domain resource and an end position of the first frequency domain resource is less than or equal to the bandwidth capability of the terminal.

4. The method according to claim 2, wherein a difference between an end position of the second frequency domain resource and a start position of the first frequency domain resource is less than or equal to the bandwidth capability of the terminal.

5. An information monitoring method, comprising:
sending, by a terminal, a bandwidth capability of the terminal to a network device;
receiving, by the terminal, indication information, wherein the indication information is used to indicate a second frequency domain resource, the second frequency domain resource is determined by the network device based on the bandwidth capability of the terminal and a first frequency domain resource allocated to the terminal, and the first frequency domain resource is used as a bandwidth part of the terminal; and
monitoring, by the terminal, common information on the second frequency domain resource,
wherein:
a second position of the second frequency domain resource is determined by the network device based on a bandwidth size of the first frequency domain resource, a bandwidth size of the second frequency domain resource, the bandwidth capability of the terminal, and a first position of the first frequency domain resource; and
the second frequency domain resource is determined by the network device based on the bandwidth size of the second frequency domain resource and the second position of the second frequency domain resource;
wherein when the second position of the second frequency domain resource is determined:
a threshold range of a start position of the second frequency domain resource is determined by the network device based on the bandwidth size of the first frequency domain resource, the bandwidth size of the second frequency domain resource, the bandwidth capability of the terminal, and the first position of the first frequency domain resource; and
a value within the threshold range of the start position of the second frequency domain resource is determined by the network device as the start position of the second frequency domain resource.

6. The method according to claim 5, wherein a difference between a start position of the second frequency domain resource and an end position of the first frequency domain resource is less than or equal to the bandwidth capability of the terminal.

7. The method according to claim 5, wherein a difference between an end position of the second frequency domain resource and a start position of the first frequency domain resource is less than or equal to the bandwidth capability of the terminal.

8. The method according to claim 5, wherein receiving, by the terminal, indication information further comprises:
receiving, by the terminal, physical layer signaling, wherein the physical layer signaling carries the indication information; or
receiving, by the terminal, higher layer signaling, wherein the higher layer signaling carries the indication information.

9. A device, comprising at least one processor and a memory coupled to the at least one processor, the at least one processor being configured to:
allocate a first frequency domain resource to a terminal, wherein the first frequency domain resource is used as a bandwidth part of the terminal;
obtain a bandwidth capability of the terminal;
determine, based on the bandwidth capability and the first frequency domain resource, a second frequency domain resource allocated to the terminal, wherein the second frequency domain resource is used by the terminal to monitor common information; and
send indication information, wherein the indication information is used to indicate the second frequency domain resource,
wherein the at least one processor is configured to perform the following steps to determine the second frequency domain resource:
determining a second position of the second frequency domain resource based on a bandwidth size of the first frequency domain resource, a bandwidth size of the second frequency domain resource, the bandwidth capability of the terminal, and a first position of the first frequency domain resource; and
determining, the second frequency domain resource based on the bandwidth size of the second frequency domain resource and the second position of the second frequency domain resource,
wherein the at least one processor is configured to perform the following steps to determine the second position of the second frequency domain resource:
determining a threshold range of a start position of the second frequency domain resource based on the bandwidth size of the first frequency domain resource, the bandwidth size of the second frequency domain resource, the bandwidth capability of the terminal, and the first position of the first frequency domain resource; and
determining a value within the threshold range of the start position of the second frequency domain resource as the start position of the second frequency domain resource.

10. The device according to claim 9, wherein the at least one processor is configured to perform the following step to determine the second frequency domain resource:
determining, based on the bandwidth capability and the first frequency domain resource, a first common bandwidth in a plurality of common bandwidths as the second frequency domain resource, wherein a bandwidth size of the first frequency domain resource and the second frequency domain resource is less than or equal to the bandwidth capability of the terminal.

11. The device according to claim 10, wherein a difference between a start position of the second frequency domain resource and an end position of the first frequency domain resource is less than or equal to the bandwidth capability of the terminal.

12. The device according to claim 10, wherein a difference between an end position of the second frequency domain resource and a start position of the first frequency domain resource is less than or equal to the bandwidth capability of the terminal.

13. A device, applied to a terminal and comprising at least one processor and a memory coupled to the at least one processor, the at least one processor being configured to:
send a bandwidth capability of the terminal to a network device;
receive indication information, wherein the indication information is used to indicate a second frequency domain resource, the second frequency domain resource is determined by the network device based on the bandwidth capability of the terminal and a first frequency domain resource allocated to the terminal, and the first frequency domain resource is used as a bandwidth part of the terminal; and monitor common information on the second frequency domain resource, wherein:

a second position of the second frequency domain resource is determined by the network device based on a bandwidth size of the first frequency domain resource, a bandwidth size of the second frequency domain resource, the bandwidth capability of the terminal, and a first position of the first frequency domain resource; and the second frequency domain resource is determined by the network device based on the bandwidth size of the second frequency domain resource and the second position of the second frequency domain resource;

wherein when the second position of the second frequency domain resource is determined:

a threshold range of a start position of the second frequency domain resource is determined by the network device based on the bandwidth size of the first frequency domain resource, the bandwidth size of the second frequency domain resource, the bandwidth capability of the terminal, and the first position of the first frequency domain resource; and a value within the threshold range of the start position of the second frequency domain resource is determined by the network device as the start position of the second frequency domain resource.

14. The device according to claim 13, wherein a difference between a start position of the second frequency domain resource and an end position of the first frequency domain resource is less than or equal to the bandwidth capability of the terminal.

15. The device according to claim 13, wherein a difference between an end position of the second frequency domain resource and a start position of the first frequency domain resource is less than or equal to the bandwidth capability of the terminal.

16. The device according to claim 13, wherein the indication information carried in physical layer signaling or higher layer signaling.

* * * * *